United States Patent [19]

Wenzel et al.

[11] 4,083,698

[45] * Apr. 11, 1978

[54] CLEAR AND STABLE LIQUID FUEL COMPOSITIONS FOR INTERNAL COMBUSTION ENGINES

[75] Inventors: Edward C. Wenzel, Hackettstown; Henry W. Steinmann, Sparta, both of N.J.

[73] Assignee: Fuel Systems, Inc., Newton, N.J.

[*] Notice: The portion of the term of this patent subsequent to Jan. 11, 1994, has been disclaimed.

[21] Appl. No.: 746,618

[22] Filed: Dec. 1, 1976

Related U.S. Application Data

[63] Continuation-in-part of Ser. No. 592,083, Jun. 30, 1975, Pat. No. 4,002,435, which is a continuation-in-part of Ser. No. 199,773, Nov. 17, 1971, abandoned, which is a continuation-in-part of Ser. No. 84,507, Oct. 27, 1970, abandoned, which is a continuation-in-part of Ser. No. 56,746, Jul. 20, 1970, abandoned.

[51] Int. Cl.² .............................................. C10L 1/18
[52] U.S. Cl. ........................................ 44/51; 252/356; 252/309
[58] Field of Search ....................... 44/51, 53; 252/309

[56] References Cited

U.S. PATENT DOCUMENTS

| 2,111,100 | 3/1938 | Kokatnur | 44/51 |
|---|---|---|---|
| 3,490,237 | 1/1970 | Lissant | 44/51 |
| 3,527,581 | 9/1970 | Brownawell | 44/51 |

Primary Examiner—Daniel E. Wyman
Assistant Examiner—Mrs. Y. Harris-Smith
Attorney, Agent, or Firm—Brumbaugh, Graves, Donohue & Raymond

[57] ABSTRACT

A fuel composition, preferably for use in internal combustion engines, comprising a water-in-oil emulsion of (a) a hydrocarbon fuel, such as gasoline, diesel fuel or fuel oil; (b) water; (c) preferably a water-soluble alcohol; and (d) a novel combination of surface-active agents to provide a clear composition which is stable against phase separation over a wide range of temperatures.

16 Claims, No Drawings

CLEAR AND STABLE LIQUID FUEL COMPOSITIONS FOR INTERNAL COMBUSTION ENGINES

This application is a continuation-in-part of our patent application Ser. No. 592,083, filed June 30, 1975, now U.S. Pat. No. 4,002,435 which is a continuation-in-part of our patent application Ser. No. 199,773, filed Nov. 17, 1971, now abandoned, which application is a continuation-in-part of our patent application Ser. No. 84,507, filed Oct. 27, 1970, now abandoned, which was, in turn, a continuation-in-part of our patent application Ser. No. 56,746, filed July 20, 1970, now also abandoned.

This invention relates to clear and stable fuel compositions, preferably for use in internal combustion engines, but which may be used for any purpose requiring a combustible hydrocarbon fuel, including domestic and industrial heat and power. More particularly, this invention relates to the preparation of clear and stable liquid fuel compositions comprising (a) a mixture of hydrocarbons, such as gasoline, diesel fuel, or fuel oil; (b) water; (c) preferably a water-soluble alcohol; and (d) a combination of surface-active agents. These clear fuel compositions are basically water-in-oil emulsions which have excellent stability and viscosity over a wide range of temperatures, including temperatures below the freezing point of water. The liquid fuel compositions, according to the invention, will further maintain their clarity and low viscosity characteristics without phase separation. Thus, the compositions, according to the invention, are most efficiently utilized in operating the internal combustion engine or any machine or apparatus operated with a hydrocabon fuel.

An important objective of this invention is to provide a fuel for the internal combustion engine which results in significant decreases of toxic exhaust gases or vapors without sacrificing engine performance or efficiency. A second objective is to provide a fuel that is free from lead compounds, such as lead tetraethyl, and still obtains anti-knock characteristics, resulting in smooth engine performance. A third objective is to provide a fuel for the internal combustion engine wherein the percentage of hydrocarbons is substantially reduced, thereby better conserving energy derived from petroleum and partly replacing it with energy having reproducible sources. A still further objective of this invention is to provide clear liquid fuel compositions that are stable and usable, both under moderate and extreme weather conditions, for any purpose requiring a hydrocarbon fuel, including domestic and industrial heating and power.

The term "water-in-oil emulsion," hereinafter referred to as "W/O emulsion," is a general term well-known to those skilled in emulsion technology. The term "W/O emulsion," as used in the context of this invention, is believed to best describe the physical make-up of the novel fuel composition which we have obtained. It must be appreciated that we have achieved, through a unique surfactant blend, a clear and stable liquid fuel which, while an emulsion, exhibits desired single-phase properties of hyrocarbon fuels alone. As an emulsion, however, the liquid fuel of the invention is believed to contain the hydrocarbon mixture as the continuous "oil" phase and water and the water-soluble components as the dispersed "water" phase. Upon blending the various components of the liquid fuel, including the surfactant mixture, the resulting fuel composition is, for the purposes intended, a single-phase composition.

The W/O emulsion is considered to be a very finely divided colloidal dispersion, so fine that it is perfectly clear to the naked eye. The "water" dispersed phase consists of extremely small micelles with orientation of the surface-active agents such that the polar and other hydrophilic groups are oriented toward the aqueous center of the micelle and the hydrophobic groups are oriented toward the outer oil phase. The water-soluble alcohol tends to favor partition toward the aqueous center of the micelle, methanol providing the strongest partition.

The oil phase of the fuel composition, according to the invention, comprises a mixture of hydrocarbons, such as that derived from petroleum, examples being gasoline, diesel fuel, and fuel oil. In the spirit of this invention, the oil phase is not confined to a specific mixture of hydrocarbons, but embraces a broad range of mixtures of hydrocarbons under the general classification of hydrocarbon fuels. Such hydrocarbon fuels will have varying viscosities and flash points, but all have the common characteristic of combustibility providing heat and energy which can be transformed into work for any number of purposes.

With respect to internal combustion engines, the basis of the invention is the development of a liquid fuel containing water, which is introduced into the fuel system in a most effective manner. It is well-known that water or steam may be injected, as a separate phase, into internal combustion engines with the purpose of lowering the reaction temperature to retard the combustion rate and improve the anti-knock characteristics. Such injection methods are not only difficult to design and control, but introduce the water as an outside phase, which not only is ineffective in smoothly retarding the rate of combustion, but also can quench the combustion, resulting in an incomplete burn. We have now discovered that, when the water is intimately mixed with the fuel, substantially complete combustion occurs with the water performing the important role of smoothly retarding the rate of combustion, resulting in anti-knock performance. This important discovery means that anti-knock agents, such as lead tetraethyl, can be eliminated in such a fuel system which not only results in cleaner engine performance, but, even more important, results in the elimination of lead compounds in the exhaust fumes, thereby abating pollution. We have further discovered that the fuel composition, according to the invention, not only gives smooth engine performance without the need for the conventional anti-knock agents, but, more important, gives much lower carbon monoxide, oxides of nitrogen, and hydrocarbon content in the exhaust gases as compared to conventional fuels not containing water.

More broadly, we have discovered that, when a particular combination of surface-active agents is added to a hydrocarbon fuel, such as gasoline, diesel fuel, or fuel oil, which is then combined with water or preferably a solution of a water-soluble alcohol and water, a hydrocarbon-rich W/O emulsion, having the clarity and stability of a single-phase hydrocarbon fuel, readily forms with minimum agitation. Moreover, the clear fuel composition, according to the invention, has a viscosity similar to that of a hydrocarbon fuel itself. It has been found that the liquid fuel composition obtained is stable against phase separation by addition of amounts of water, alcohol, or hydrocarbon fuel.

Accordingly, our invention is the discovery of certain combinations of surface-active agents which will bring both the alcohol, water, water-soluble constituents, and the hydrocarbon fuel constituent into complete phase, resulting in a clear, stable liquid fuel for a variety of uses including use in internal combustion engines. Once this clear phase is formed, it is no longer sensitive to the addition of small amounts of water and alcohol, or to additional amounts of the hydrocarbon fuel. The clear, stable liquid fuel containing the water, water-soluble alcohol, and surface-active agents has a low viscosity, like the hydrocarbon fuel itself, thereby making it particularly adaptable for storage in stationary fuel tanks and for transport and utilization in conventional carburetor systems. It is also important that the surface-active agents themselves are organic compounds and, therefore, combustible to carbon dioxide and water, which still further provide energy. The surface-active agents also tend to broaden the temperature-time combustion profile because of their high flash points.

The surface-active agents, according to the invention, are virtually non-toxic in that they do not contain harmful materials, such as sulfur, phosphorous, and halogens. While certain surface-active agents contemplated do contain a small amount of nitrogen, the amounts present are insignificant, particularly when compared to the amount of nitrogen introduced by the air required for combustion.

The unique and novel combination of surface-active agents of the invention comprises (1) a long-chain fatty acid salt, or, more preferably, an ammonium or sodium long-chain fatty acid salt, or mixture thereof; (2) a free unsaturated long-chain fatty acid, or a mixture of a free unsaturated organic acid and a free saturated long-chain fatty acid; and (3) a non-ionic surfactant typified by ethylene oxide condensation products and esterification products of a fatty acid with ethylene oxide. While the most preferred embodiment includes a mixture of ammonium and sodium oleate, free oleic acid, and the condensation product of an alkyl phenol with ethylene oxide, many other surfactant combinations provide the most novel advantages of the invention. This combination of surface-active agents, when added to the hydrocarbon fuel, water, and alcohol constituents, provides a clear liquid fuel composition which is stable, i.e., it will not separate into phases, at temperatures below the freezing point of water.

Although oleic acid is most preferred, both as the free acid, and in combination with the ammonium and sodium hydroxide to form the salts, other unsaturated acids having from about 12–18 carbon atoms, such as linoleic, may be used as well as mixtures of these acids. Also, saturated long-chain fatty acids having from about 12–18, such as stearic, palmitic, myristic or lauric acids or mixtures thereof, may be used in combination with greater amounts of unsaturated acids. The ease with which the saturated fatty acids can be used depends on their solubilities. Myristic is the preferred saturated acid to use in combination with oleic or linoleic acid.

Soya fatty acids comprising a mixture of unsaturated and saturated fatty acids can be used with oleic acid or linoleic acid. Also, distilled tall oil comprising a mixture of unsaturated fatty acids and rosin acids can be used with oleic acid or linoleic acid. Although the soya fatty acids and distilled tall oil already contain oleic and linoleic, it is preferred that the percentage of oleic or linoleic be increased further by the addition of these unsaturated fatty acids. The saturated fatty acids, regardless of their source, can be incorporated in the fatty acid mixture, provided that, as always, the unsaturated acid is present in a comparatively high percentage in order to achieve clear and stable W/O emulsions.

The ethylene oxide condensation products which may be used according to the invention are as follows:

1. Reaction products of ethylene oxide with alkyl phenols having the formula

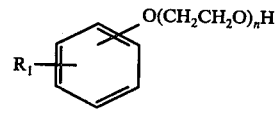

where $R_1$ is an alkyl chain having up to eight carbon atoms, such as n-butyl, isooctyl, and the like; and $n$ is an integer which can vary between wide limits, such as 5 to 30, and whose value determines the degree of hydrophilic character of the surface-active agent.

2. Reaction products obtained by the condensation with ethylene oxide of fatty acids of the formula

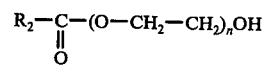

and fatty alcohols of the formula

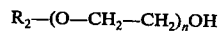

where $R_2$ is a long-chain, saturated or unsaturated hydrocarbon radical, having 12 to 18 carbon atoms, such as stearyl, cetyl, lauryl, oleyl, linoleyl, and the like; and $n$ is an integer which can vary between wide limits, such as 5 to 30, and whose value determines the degree of hydrophilic character of the surface-active agent.

3. Reaction products of a polyol with long-chain, saturated or unsaturated fatty acids having the formula

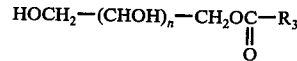

where $R_3$ is a long-chain saturated or unsaturated hydrocarbon radical having 12 to 18 carbon atoms, such as stearyl, lauryl, oleyl, and the like; and $n$ is an integer having a value between 1 and 4.

4. Reaction products of a polyol with long-chain, saturated or unsaturated fatty acids and also condensation with ethylene oxide having the formula

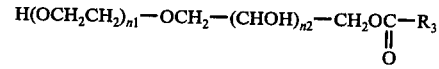

where $R_3$ is a long-chain, saturated or unsaturated hydrocarbon radical having 12 to 18 carbon atoms such as lauryl, oleyl and the like; $n_1$ is an integer having a value between 5 and 20 in the polyoxyethylene chain; and $n_2$ is an integer having a value usually between 1 and 4.

It has also been discovered that the addition of a solution of cyclohexanol and cyclohexanone enhances the stability of the emulsion particularly at low temperatures. This solution is particularly useful when the non-ionic surfactant does not contain a polyoxyethylene group like category 3 above. The solution should predominate in cyclohexanol. Thus, an 85/15 v/v cyclohexanol/cyclohexanone solution was found to be very effective in concentrations up to about 15% by weight.

It was discovered that, when the ammonium and sodium salts of oleic acid were used without the aforementioned condensation products, we could not obtain a stable fuel composition containing water, a water-soluble alcohol, and a mixture of hydrocarbons. Phase separation occurred on cooling the fuel composition below the freezing point of water. It was also found that, if the condensation products were used without the ammonium and/or mixture of ammonium and sodium salts of a long-chain fatty acid, a stable, clear, single-phase liquid containing water, a water-soluble alcohol, and mixture of hydrocarbons could not even be formed at room temperature, that is, phase separation into two phases always occurred. But, when we used a combination of the ammonium and/or mixture of ammonium and sodium salts of the long-chain fatty acids and a condensation product according to the invention, liquid fuel compositions, stable and clear above and below the freezing point of water, were obtained from the addition of this combination of surface-active agents to the mixture of water, a water-soluble alcohol, and the mixture of hydrocarbons.

The water and water-soluble alcohol constituents of the fuel composition, according to the invention, provide many advantages. The invention resides in a novel combination of elements which bring the water and alcohol into intimate contact with the fuel hydrocarbons, such as gasoline, resulting in a liquid composition which is not only clear, but also stable, over the operative temperature range of the internal combustion engine. The purpose of the water in the fuel is to provide a lower temperature and broader temperature-time profile during the combustion of the fuel. This results in lower emissions of oxides of nitrogen and carbon monoxide in the exhaust gases, thereby abating air pollution. The broader temperature-time profile results in smooth engine performance. It is believed that the water sufficiently retards the initial phase of the combustion, thereby imparting anti-knock characteristics to hydrocarbon fuels used in internal combustion engines.

The purpose of the water-soluble alcohol, such as methanol, is to provide anti-freeze characteristics to the fuel, thereby resulting in a liquid fuel stable below the freezing point of water. A second purpose of the alcohol is an energy source partly replacing the petroleum-derived hydrocarbons. A third purpose of the alcohol is that it also contributes anti-knock characteristics to the fuel, resulting in improved engine performance.

Although we prefer methanol, the other water-soluble alcohols, such as ethanol, isopropanol, and mixtures of these, can be used for this invention. Mixtures are particularly useful in broadening the types of materials used in making the W/O emulsions. It has been found that isopropanol enhances the stability of the emulsion especially at low temperatures. This is particularly true for W/O emulsions with gasoline.

The percentage of water by weight in the composition should range from about 0.1% to 10% and preferably ranges from 0.5% to 5%. A range of 0.1% to 20% alcohol by weight may be used, preferably 1% to 10%. While the amount of surface-active agents required must depend on the amounts of water and alcohol used in the fuel compositions, it is generally preferred that the ratio of the condensation products to the ammonium and/or mixture of ammonium and sodium salts of the saturated or unsaturated long-chain fatty acids be in the range of 1:2 to 3:1 by weight. In addition, when preparing W/O emulsions with gasoline it is preferred that the ratio of non-ionic surfactants to the mixture of the ammonium and sodium salts of the unsaturated and saturated acids and free unsaturated acid is about 2:1. However, when preparing W/O emulsions with diesel fuel or fuel oil the preferred ratio is about 1:2.

The surface-active agents have the prime role of making it possible to form the W/O emulsions. But, it should not be overlooked that they provide considerable heat energy when combusted. For example, oleic acid has a heat value of 9.1 Kcal/g. which is only 2.1 Kcal lower than octane.

The presence of the sodium salt of the long-chain fatty acid is not necessary to obtain clear, stable liquid fuel compositions in a single phase. This can be accomplished with just the ammonium salt in combination with the aforementioned condensation products. However, the presence of a sodium ion, in addition to an ammonium ion, in the composition is preferred. The advantage of this is that the sodium salt of the long-chain fatty acid can react with acids stronger than the fatty acid, thereby neutralizing them. The result is not only less corrosive materials in contact with the engine parts and exhaust system, but, even more important, less toxic materials in the exhaust gases and vapors. The following factors illustrate the importance of using combined ammonium and sodium salts.

1. Any orgnaic bromides or chlorides that may be present in gasoline as additives normally will generate hydrobromic or hydrochloric acids during combustion. Even small amounts of these additives are corrosive and irritating. However, if our fuel composition is used, the stable sodium chloride and sodium bromide would be formed, which are much less corrosive and both non-toxic and non-irritating.

2. Oxides of nitrogen in the presence of water vapor can be partially neutralized to form the more stable and less toxic and less irritating sodium salts.

3. Orgnaic sulfur compounds which may be present in gasoline generate sulfur dioxide on combustion. With the high exhaust temperature, and especially in the presence of catalysts, such as contained in catalytic devices, oxidation to the toxic and very irritating sulfur trioxide, and subsequent entrainment of sulfuric acid in the exhaust gases and vapors, results. The presence of a sodium ion may result in the more stable sodium sulfite compared to $SO_2$ or $H_2SO_3$, and there may be less tendency for the sulfur dioxide to be oxidized to sulfur trioxide by the catalytic converter. Even if the sulfur dioxide is oxidized to a partial extent forming sulfur trioxide, the resulting sulfuric acid would be neutralized, even at the high temperature, resulting in the non-toxic and non-irritating water-soluble sulfate.

Since greater stability is achieved with the ammonium salt of the long-chain fatty acids, it should be present to a larger percentage than the sodium salt. The preferred molar ratio of the ammonium to the sodium salt of the long-chain fatty acid is in the range from 95:5 to 50:50 but may range from 95:5 to 5:95, depending upon the type of fuel used. In general, it is possible depending upon the surfactant mix to use only ammonium salts or only sodium salts with gasoline. However, with diesel fuel or fuel oil sodium salts cannot be used alone. Because of the similarities of potassium and lithium salts to sodium salts, since these metals comprise the same family, i.e. alkali metals, they can also be used in combination with ammonium salts of the fatty acids. It should also be recognized that the sodium ion can be introduced as the sodium salt of a short-chain fatty acid, such as sodium acetate in minor percentages. Since our fuel compositions contain water, the very water-soluble sodium acetate will be solubilized in the system. But, it is easier to use the sodium salt of the long-chain fatty acids because the resultant fuel compositions tend to be more stable.

An important advantage in using the combination of surface-active agents, according to the invention, is that high-shear mixing is not required. The ingredients of the fuel composition readily blend into a single phase by gentle hand stirring. This means that the fuel compositions can be readily prepared at the manufacturing site for delivery to home or industry storage tanks or, if preferred, the fuel compositions can be blended with the other constituents at the site of use, such as at a gasoline station by simply metering the proper amounts of each constituent from storage tanks into a common mixing line.

The liquid fuel compositions of the invention can be utilized in conventional internal combustion engines without any change or modification in engine design. They can be used at low compression ratios, such as 8 to 1, or at high compression ratios, such as 10 to 1. Engine tests conducted with these fuel compositions show better performance at the more efficient high compression ratios. This is significant regarding the more efficient utilization of fuel and better conserving of our energy resources. Moreover, our fuel compositions can contain a high percentage of the highly volatile methanol and still be utilized in conventional carburetor systems without vapor lock occurring.

There are several ways in which the components can be combined to form a suitable fuel composition. Most of the surface-active agents can first be added to the hydrocarbon phase and a small amount in the aqueous phase, and then the latter added to the former. Also, the alcohol can be added as a solution in water or it can be added separately, either to the hydrocarbon fuel phase or after the water phase has been dispersed. The preferred method of admixture is to blend the following three solutions simultaneously, (1) unleaded gasoline, fuel oil, or diesel fuel;
(2) an aqueous solution of surface-active agents; and
(3) a solution of a water-soluble alcohol in water.

The following examples are provided simply to illustrate the embodiments of our invention and are not intended to limit it in any way.

EXPERIMENTAL EXAMPLES

The examples described in the following paragraphs involve the use of unsaturated and saturated fatty acids and various kinds of non-ionic surfactants. The examples are divided into gasoline and diesel fuel compositions. To simplify the description for each experiment, trade names are used. Table I below provides the manufacturer and the chemical description of the various trade name materials used.

TABLE I

| Trade Name | Manufacturer | Chemical Description |
| --- | --- | --- |
| A. Non-Ionic Surfactant | | |
| NP-14 | Union Carbide | Condensation product of ethylene oxide with an alkyl phenol. |
| NP-27 | Union Carbide | Same as NP-14 except that it contains a greater average number of ethylene oxide groups per alkyl phenol. |
| Lipal-9-OL | Union Carbide | Polyoxyethylene oleate. |
| Emerest 2620 | Emery Industries | PEG (200) Monolaurate where PEG (200) represents polyethylene glycol having an average molecular weight of 200. |
| Emerest 2652 | Emery Industries | PEG (400) Dilaurate where PEG (400) represents polyethylene glycol having an average molecular weight of 400. |
| Emerest 2646 | Emery Industries | PEG (400) monooleate. |
| Emerest 2648 | Emery Industries | PEG (400) dioleate. |
| Emsorb 2515 | Emery Industries | Sorbitan monolaurate. |
| Emsorb 6915 | Emery Industries | POE (20) Sorbitan Monolaurate where POE (20) represents an average of 20 polyoxyethylene groups. |
| Emsorb 6910 | Emery Industries | POE (20) Sorbitan monopalmitate. |
| Emsorb 2500 | Emery Industries | Sorbitan monooleate. |
| Emsorb 6901 | Emery Industries | POE (5) Sorbitan monooleate. |
| Emsorb 6900 | Emery Industries | POE (20) Sorbitan monooleate. |
| Emsorb 2503 | Emery Industries | Sorbitan trioleate. |
| Span 80 | J. T. Baker | Sorbitan oleate. |
| Tween 80 | J. T. Baker | POE (20) Sorbitan oleate. |
| B. Saturated and Unsaturated Fatty Acids | | |
| Emery 621 Coconut Fatty Acid | Emery Industries | Typical Composition consists of: 48% lauric acid, 20% myristic acid, 10% palmitic acid, 10% oleic acid, 5% capric acid, 4% caprylic acid, 2% stearic acid and 1% linoleic acid. |
| Emersol 305 | Emery Industries | Typical Composition: 60% |

TABLE I-continued

| Trade Name | Manufacturer | Chemical Description |
|---|---|---|
| Linoleic Acid | | linoleic acid, 31% oleic acid, 3.5% palmitic acid, 2.5% linolenic acid, 0.5% stearic acid, 1% myristic acid and 1% palmitoleic acid. |
| Emery 651 Lauric Acid 95 | Emery Industries | Typical Composition: 96% lauric acid, 3% myristic acid and 1% capric acid. |
| Emery 655 Myristic Acid 97 | Emery Industries | Typical Composition: 97% myristic acid, 2% palmitic acid and 1% lauric acid. |
| Emersol 140 Palmitic Acid 70 | Emery Industries | Typical Composition: 74% palmitic acid, 21% stearic acid, 3% myristic acid, 1% margaric acid, 0.5% bentadecanoic acid and 0.5% oleic acid. |
| Emtall 729 Distilled Tall 0:1 | Emery Industries | Typical Composition: 36–42% rosin acids, 18% oleic acid, 15% linoleic acid, 9% linoleic acid, and 1% stearic acid. |
| Emery 610 Soya Fatty Acid | Emery Industries | Typical Composition: 48% linoleic acid, 25.5% oleic acid, 16% palmitic acid, 5% linolenic acid, 4% stearic acid, 1% palmitoleic acid |
| Oleic Acid U.S.P. | J. T. Baker | and 0.5% myristic acid. |
| Stearic Acid U.S.P. | Mallinckrodt | |

EXAMPLES USING UNLEADED GASOLINE

I. Examples Using Ammonium Oleate, Free Oleic Acid and Ethylene Oxide Condensation Products

EXAMPLE 1

A stock solution was prepared by mixing 1,000 ml. of NP-14, 1,000 ml. of NP-27, 900 ml. of oleic acid, and 100 ml. of concentrated ammonium hydroxide solution. The ammonium hydroxide solution contained 29.9% $NH_3$ and had a density of 0.89 gm/ml. The NP-14 and NP-27 materials were found to have respective densities of 1.03 and 1.06 gm/ml.

The stock solution, therefore, contained the following:

| | |
|---|---|
| 1,030 grams NP-14 | |
| 1,060 grams NP-27 | |
| 468 grams ammonium oleate | |
| 363 grams free oleic acid | |
| 62 grams water | |
| 2,983 grams total | |

This solution was viscous, colorless, and clear at room temperature. It had a density of 0.98 gm/ml.

The stock solution, labeled E-019, was used to prepare the following liquid fuel formulations:

| | E-019 ml | Water ml | Methanol ml | Unleaded Gasoline ml |
|---|---|---|---|---|
| Formulation A | 25 | 5 | 15 | 340 |
| Formulation B | 25 | 10 | 10 | 340 |

In preparing each formulation, the water and methanol were first added to E-019, resulting in a clear solution. Unleaded gasoline was added to this clear solution, resulting in a clear, single-phase liquid.

Both the liquid fuel compositions were refrigerated at −20° C. overnight. They were then examined and found to still be clear and in a single phase. The samples were removed, brought to room temperature, and them immersed in warm water. They still remained clear and in a single phase. In other words, there was no phase separation or reduction in clarity by subjecting the samples to extreme temperature differences.

The calculated weight percentages of the constituents of the above formulations are as follows:

| | Formulation | |
|---|---|---|
| | A | B |
| Unleaded gasoline, % | 85.60 | 85.25 |
| NP-14, % | 2.96 | 2.95 |
| NP-27, % | 3.04 | 3.04 |
| Ammonium oleate, % | 1.34 | 1.34 |
| Free oleic acid, % | 1.03 | 1.04 |
| Water, % | 1.93 | 3.66 |
| Methanol, % | 4.10 | 2.72 |

EXAMPLE 2

Formulation A of Example 1 was kept the same except that the 15 ml. of ethanol were replaced by 15 ml. of ethanol. These resulted a clear, single-phase liquid. This liquid was also refrigerated at −20° C. overnight. It was examined and found to still be clear. The clarity and single phase remained the same when the liquid fuel was warmed.

EXAMPLE 3

Formulation A of Example 1 was kept the same except that the 15 ml. of methanol were replaced by 15 ml. of isopropanol. There resulted a clear, single-phase liquid. It also maintained the same clarity and single phase after subjection to −20° C. overnight and then followed by warming.

EXAMPLE 4

A solution was prepared from 90 ml. of oleic acid, 15 ml. of concentrated ammonium hydroxide (29.9% $NH_3$ and density of 0.89 gm/ml), and 100 ml. of Span 80 (an ester of a polyol and long-chain fatty acid).

Ten ml. of water and 10 ml. of methanol were added to 25 ml. of this solution. There resulted a clear solution to which were added 340 ml. of unleaded gasoline. A clear, single-phase liquid was obtained having a low viscosity, such as those fuel compositions described in Examples 1 to 3. It also maintained the same clarity and single phase after subjection to −20° C. overnight and then followed by warming.

EXAMPLE 5

One gram of sodium hydroxide in 5 ml. of water was added to 100 ml. of the stock solution labeled E-019, described in Example 1. This was sufficient sodium hydroxide to neutralize about 59% of the free oleic acid so that the molar percent ratio of ammonium oleate to sodium oleate in the resulting solution was about 67 to 33. When the sodium oleate first formed, it precipitated out but then quickly dissolved, resulting in a clear solution.

Ten ml. of methanol were added to 80 ml. of low-lead gasoline. Phase separation occurred. Then, 10 ml. of the above solution were added, and the contents lightly stirred. There resulted a single-phase, clear, low viscosity liquid. This liquid was placed in a freezer at −20° C. overnight. The fuel composition was still clear and in a single phase at this low temperature.

EXAMPLE 6

Performance tests were conducted at a commercial laboratory which was fully equipped to follow the 1973 Federal Test Procedure for constant volume sampling of exhaust gases.

The test vehicle was a 1973 Plymouth Fury III (A Chrysler Corporation product).

Vehicle specifications were as follows:

| Displacement | 360 cubic inches |
|---|---|
| A/F ratio | 15.5:1 |
| Compression ratio | 8.5:1 |

The vehicle was equipped with government specified emission control devices, i.e., exhaust gas recirculation and positive crankcase ventilation.

The base fuel was a 91 octane low-lead gasoline blend. The stock solution, E-019, of Example 1 was used to prepare two clear liquid fuel compositions comprising the following weight percentages:

|  | Fuel Composition A | Fuel Composition B |
|---|---|---|
| Percent water | 2.5 | 0.5 |
| Percent methanol | 2.5 | 7.5 |
| Percent E-019 | 6.9 | 10.5 |
| Percent base fuel | 88.1 | 81.5 |

The base fuel and fuel composition A were tested in the above engine. The exhaust emissions in grams/mile were as follows:

| | Exhaust Emissions In Grams/Mile | |
|---|---|---|
| | Base Fuel | Fuel Composition A |
| HC | 3.7 | 3.2 |
| CO | 36.0 | 18.7 |
| $NO_x$ | 4.7 | 3.1 |
| Total | 44.4 | 25.0 |

These data show a 44% reduction in total exhaust emissions using fuel composition A compared to the base fuel. Furthermore, the research octane number increased from 93.2 to 95.2 in going from the base fuel to fuel composition A.

The base fuel was then compared with fuel composition B, giving the following test results:

| | Exhaust Emissions In Grams/Mile | |
|---|---|---|
| | Base Fuel | Fuel Composition B |
| HC | 2.73 | 2.70 |
| CO | 50.46 | 26.26 |
| $NO_x$ | 3.10 | 2.83 |
| Total | 56.29 | 31.79 |

These data also show about a 44% reduction in total exhaust emissions using fuel composition B compared to the base fuel. Performance through cold starts and accelerations was found equally good for fuel composition B compared to the base fuel.

EXAMPLE 7

The following solutions or mixtures were blended:
(a) 160 ml. of lead-free gasoline;
(b) a mixture of 5 ml. of NP-14 and 5 ml. of NP-27 (non-ionic surfactants of the polyoxyethylene alkyl phenol-type obtained from Union Carbide Corporation), and 5 ml. of a solution of ammonium oleate in oleic acid in which the concentration of ammonium oleate was about 50%; and
(c) a solution of 5 ml. of water and 5 ml. of ethyl alcohol.

When (b) was added to (a), a clear solution resulted. When (c) was added and the contents mixed gently, a W/O emulsion resulted. When a beam of light was passed through the W/O emulsion fuel held in a dark room, we observed the Brownian Motion of collodial particles within the shaft of light, confirming the Tyndall effect of the liquid-to-liquid collodial emulsion.

The composition was placed in a refrigerator and cooled to about −12° F. The cold emulsion remained clear and still exhibited the characteristic Tyndall effect.

EXAMPLE 8

The same formulation as in Example 7 except that the ethanol was replaced with methanol. A stable composition resulted as in Example 7.

EXAMPLE 9

The same formulation as in Example 7 except that the ethanol was replaced with isopropanol. A stable composition resulted as in Example 7.

II. Examples Using Linoleic Acid and Various Non-Ionic Surfactants for W/O Emulsions with Unleaded Gasoline Five stock solutions (SS) A to E were prepared by mixing linoleic acid (Emersol 305), methanol, water and concentrated ammonium hydroxide in that order. Clear solutions were obtained. Details on the five stock solutions that were prepared are as follows:

TABLE II

| Stock Solutions | Volumes (mls) Mixed | | | | |
|---|---|---|---|---|---|
| | A | B | C | D | E |
| Emersol 305 | 90 | 90 | 45 | 45 | 90 |
| Methanol | 100 | 100 | 100 | 100 | 100 |
| Water | 10 | 10 | 25 | 25 | 50 |
| 29% Ammonium Hydroxide | 10 | 5 | 7.5 | 5 | 10 |

| Stock Solutions | Weights (gms) After Mixing and Reaction | | | | |
|---|---|---|---|---|---|
| | A | B | C | D | E |
| Free Fatty Acids | 38.0 | 59.5 | 8.2 | 19.0 | 38.0 |
| Ammonium Salts of Fatty Acids | 45.5 | 22.8 | 34.2 | 22.8 | 45.6 |
| Methanol | 79.0 | 79.0 | 79.0 | 79.0 | 79.0 |
| Water | 16.4 | 13.2 | 29.8 | 28.2 | 56.4 |
| | 178.9 | 174.5 | 151.2 | 149.0 | 219.0 |
| Volume of Stock Solution for each Experiment, mls. | 22 | 20.5 | 18 | 18 | 25 |
| Weight of Stock Solution, gms. | 18.7 | 17.3 | 15.9 | 16.3 | 22.5 |

W/O emulsions were prepared by adding 10 mls. of a non-ionic surfactant to 70 mls. of unleaded gasoline followed by the given volume of one of the stock solutions.

The following table shows the particular combination of non-ionic surfactant and stock solution for each experiment and also, the weight percentages of each component in the given W/O emulsion:

TABLE III

| Ex. No. | Stock Solution | Non-Ionic Surfactant Trade Name | Weight Percentages in Formulation | | | | | |
|---|---|---|---|---|---|---|---|---|
| | | | Unleaded Gasoline | Non-Ionic | Free Fatty Acids | Ammonium Salts of the Fatty Acids | Methanol | Water |
| 10 | A | NP-14 and NP-27 (5 mls. each) | 64.3 | 12.5 | 4.9 | 5.9 | 10.3 | 2.1 |
| 11 | A | Lipal-9-OL | 64.3 | 12.5 | 4.9 | 5.9 | 10.3 | 2.1 |
| 12 | A | Emerest 2620 | 64.3 | 12.5 | 4.9 | 5.9 | 10.3 | 2.1 |
| 13 | A | Emerest 2646 | 64.3 | 12.5 | 4.9 | 5.9 | 10.3 | 2.1 |
| 14 | A | Emsorb 6900 | 64.3 | 12.5 | 4.9 | 5.9 | 10.3 | 2.1 |
| 15 | B | Tween 80 | 65.4 | 12.6 | 7.5 | 2.9 | 9.9 | 1.7 |
| 16 | B | Emsorb 6910 | 65.4 | 12.6 | 7.5 | 2.9 | 9.9 | 1.7 |
| 17 | B | Emsorb 6915 | 65.4 | 12.6 | 7.5 | 2.9 | 9.9 | 1.7 |
| 18 | C | NP-14 | 66.7 | 12.9 | 1.1 | 4.6 | 10.7 | 4.0 |
| 19 | C | NP-14 and NP-27 (5 mls. each) | 66.7 | 12.9 | 1.1 | 4.6 | 10.7 | 4.0 |
| 20 | C | Emerest 2652 | 66.7 | 12.9 | 1.1 | 4.6 | 10.7 | 4.0 |

All of these W/O emulsions when prepared at room temperature were clear. They were then placed in a freezer at −24° C. for at least overnight (14 hours). When removed from the freezer and visually examined, it was found that all of the emulsions were still clear in a single phase.

All emulsions exhibited the Tyndall effect when examined with a beam of light in a dark room.

These emulsions can tolerate further additions of methanol and also water and still maintain excellent stability at both room temperature and low temperature. For example, the samples of experiments 12 and 14 were warmed to room temperature and then 5 mls. of methanol added to each. The samples were again exposed to −24° C overnight and found to be clear and stable. The weight percent composition for each of these was: unleaded gasoline - 61.3, non-ionic- 11.9, free fatty acids- 4.7, ammonium salts of fatty acids 5.6, methanol-14.5 and water - 2.0. In another example, 5 mls. of water were added to the sample of Ex. 15. The emulsion remained clear at −24° C. The weight percent composition of this now was: unleaded gasoline - 61.6, non-ionic - 11.9, free fatty acids - 7.0, ammonium salts of fatty acids - 2.7, methanol - 9.3 and water - 7.5.

Isopropanol enhances the stability of W/O emulsions with gasoline at sub-freezing temperatures. This is particularly effective when the non-ionic does not contain a polyoxyethylene group like sorbitan monolaurate. It is also effective when it is desirable to have a high weight percentage of methanol in the formulation. For example, 70 mls. of unleaded gasoline, 10 mls. of Emsorb 2515, 22 mls. of stock solution A, 10 mls. of methanol and 5 mls. of isopropanol gave a clear, stable W/O emulsion both at room temperature and −24° C. The weight composition was: unleaded gasoline - 56.1, non-ionic - 10.8, free fatty acids - 4.3, ammonium salts of fatty acids - 5.2, methanol - 17.5, isopropanol - 4.2 and water - 1.9.

It was discovered that the addition of cyclohexanol/cyclohexanone, like isopropanol, enchaces low temperature stability of the W/O emulsions. The cyclohexanol/cyclohexanone solution should be predominant in cyclohexanol. A 85/15 v/v solution was used. As example, 70 mls. of unleaded gasoline, 5 mls. of Lipal-9-OL, 9 mls. of 85/15 cyclohexanol/cyclohexanone, and 18 mls. of stock solution D gave a clear W/O emulsion which was stable at −24° C, that is, remained in a clear, single phase emulsion at this low temperature.

The weight percent composition of this W/O emulsion was: unleaded gasoline - 63.5, non-ionic surfactant - 6.1, free fatty acids - 2.6, ammonium salts of fatty acids - 3.0, methanol - 10.6, cyclohexanol/cyclohexanone - 10.4 and water - 3.8.

III. Examples With Oleic Acid and Various Non-Ionic Surfactants for W/O Emulsions With Unleaded Gasoline Four stock solutions F to G were prepared by mixing oleic acid, methanol, water and concentrated ammonium hydroxide in that order. Clear solutions resulted. Details on the four stock solutions are as follows:

TABLE IV

| Stock Solutions | Volumes (mls.) Mixed | | | |
|---|---|---|---|---|
| | F | G | H | I |
| Oleic Acid | 450 | 450 | 45 | 45 |
| Methanol | 500 | 500 | 100 | 100 |
| Water | 218 | 52 | 48 | 25 |
| 29% Ammonium Hydroxide | 50 | 50 | 2.5 | 5 |

| | Weights (gms.) after mixing and Reaction | | | |
|---|---|---|---|---|
| Free Oleic Acid | 188.5 | 188.5 | 29.7 | 18.8 |
| Ammonium Oleate | 229.6 | 229.6 | 11.5 | 23.0 |
| Methanol | 395.0 | 395.0 | 79.0 | 79.0 |
| Water | 250.0 | 84.0 | 49.6 | 28.2 |
| | 1063.1 | 897.1 | 169.8 | 149.0 |

TABLE IV-continued

| Volume of Stock Solution used for each experiment, mls. | 25 | 22 | 20 | 17.5 |
|---|---|---|---|---|
| Weight of Stock Solution used, gms. | 21.8 | 18.6 | 17.6 | 15.2 |

W/O emulsions were prepared by adding 10 mls. of a non-ionic surfactant to 70 mls. of unleaded gasoline followed by the given volume of one of the stock solutions.

The following table shows the particular combination of non-ionic surfactant and stock solution for each experiment and also, the weight percentages of each component in each of the given W/O emulsions:

TABLE V

| Ex. No. | Stock Solution | Non-Ionic Surfactant Trade Name | Weight Percentages in Formulation | | | | | |
|---|---|---|---|---|---|---|---|---|
| | | | Unleaded Gasoline | Non-Ionic | Free Oleic Acids | Ammonium Oleate | Methanol | Water |
| 21 | H | NP-14 and NP-27 (5 mls. each) | 65.2 | 12.6 | 3.9 | 1.5 | 10.3 | 6.5 |
| 22 | I | NP-14 and NP-27 (5 mls. each) | 67.3 | 13.0 | 2.5 | 3.0 | 10.5 | 3.7 |
| 23 | I | Lipal-9-OL | 67.3 | 13.0 | 2.5 | 3.0 | 10.5 | 3.7 |
| 24 | I | Emerest 2652 | 67.3 | 13.0 | 2.5 | 3.0 | 10.5 | 3.7 |
| 25 | I | Emsorb 6915 (12 mls. instead of 10) | 65.6 | 15.2 | 2.4 | 3.0 | 10.2 | 3.6 |
| 26 | I | Emsorb 6910 (12 mls. instead of 10) | 65.6 | 15.2 | 2.4 | 3.0 | 10.2 | 3.6 |
| 27 | I | Emerest 2620 | 67.3 | 13.0 | 2.5 | 3.0 | 10.5 | 3.7 |

All of the W/O emulsions were clear at room temperature when placed in the freezer at −24° C overnight (at least 14 hours) and re-examined they were found to still be clear in a single phase. All of them exhibited the Tyndall effect when examined with a beam of light in a dark room.

Certain emulsions were clear at room temperature but not completely stable at −24° C. A common occurrence in these cases was the presence of a flocculent, amorphous looking precipitate. It was found that the addition of 10 mls. of methanol to each of these emulsions stabilized them at −24° C.

Examples of these are given in the following table:

IV. Examples With Mixture of Emersol 140 (Palmitic Acid 70, and Oleic Acid With Various Non-Ionic Surfactants for W/O Emulsions With Unleaded Gasoline Preparation of Stock Solution J A weight of 5.0 gms. of Emersol 140 was treated with 100 mls. of absolute ethanol. Some dissolved but the rest of the solid fatty acid was slightly swollen. When 5 mls. of concentrated ammonium hydroxide were added, the entire contents changed to a milky, thick suspension. Then 50 mls. of water were added which thinned the mixture. There were insoluble particles still present. However, on shaking the solution for about 10 minutes the particles dissolved resulting in a slightly cloudy solution. Then 37 gms. of oleic acid were added. The solution became crystal clear.

The weights of components in Stock Solution J were:

| | Grams |
|---|---|
| Ammonium Salts of Fatty Acids from Emersol 140 | 5.3 |
| Ammonium Oleate | 17.3 |
| Free Oleic Acid | 20.7 |
| Ethanol | 79.0 |
| Water | 53.2 |
| | 175.5 |

Volume of stock solution J for each experiment, mls. 21
Weight of stock solution J for each

TABLE VI

| Ex. No. | Stock Solution | Non-Ionic Surfactant Trade Name | Weight Percentages in Formulation | | | | | |
|---|---|---|---|---|---|---|---|---|
| | | | Unleaded Gasoline | Non-Ionic | Free Oleic Acid | Ammonium Oleate | Methanol | Water |
| 28 | G | NP-14 and NP-27 (5 mls. each) | 58.7 | 11.3 | 4.4 | 5.4 | 18.2 | 2.0 |
| 29 | G | Lipal-9-OL | 58.7 | 11.3 | 4.4 | 5.4 | 18.2 | 2.0 |
| 30 | G | Emerest 2646 | 58.7 | 11.3 | 4.4 | 5.4 | 18.2 | 2.0 |

TABLE VII

| Ex. No. | Stock Solution | Non-Ionic Surfactant Trade Name | Weight Percentages in Formulation | | | | | | |
|---|---|---|---|---|---|---|---|---|---|
| | | | Unleaded Gasoline | Non-Ionic | Free Oleic Acid | Ammonium Oleate | Methanol | Iso-propanol | Water |
| 31 | F | NP-14 and NP-27 (5 mls. each) | 54.3 | 10.5 | 4.0 | 4.9 | 16.8 | 4.1 | 5.4 |
| 32 | F | Lipal-9-OL | 54.3 | 10.5 | 4.0 | 4.9 | 16.8 | 4.1 | 5.4 |
| 33 | F | Emerest 2646 | 54.3 | 10.5 | 4.0 | 4.9 | 16.8 | 4.1 | 5.4 |

-continued

| | Grams |
|---|---|
| experiment, gms. | 18.9 |

W/O emulsions were prepared by adding 10 mls. of a non-ionic surfactant to 70 mls. of unleaded gasoline followed by 21 mls. of stock solution J.

Using a variety of non-ionic surfactants clear emulsions were easily obtained at room temperature. However, all of the emulsions failed when exposed to −24° C. A flocculent precipitate occurred in all cases ranging from very small amount to a medium amount depending on the particular non-ionic surfactant used.

The addition of either ethanol or isopropanol stabilized the emulsions at −24° C. Water or methanol could be added but neither one of these stabilized the emulsion at −24° C. unless ethanol or isopropanol was also added. Examples in which stock solution J gave stable emulsions both at room temperature and −24° C. are:

-continued

| | Grams |
|---|---|
| Ammonium Oleate | 16.4 |
| Free Oleic Acid | 22.4 |
| Methanol | 39.5 |
| Ethanol | 39.5 |
| Water | 53.2 |
| | 176.4 |
| volume of stock solution K for each experiment, mls. | 21 |
| Weight of stock solution K for each experiment, gms. | 19.0 |

W/O emulsions were prepared by adding 10 mls. of a non-ionic surfactant to 70 mls. of unleaded gasoline followed by 21 mls. of stock solution K.

Using 5 mls. each of NP-14 and NP-27, 10 mls. of Lipal-9-OL or Emerest 2646 respectively, gave clear W/O emulsions immediately. These were stable at −24° C. overnight; clear, single-phase emulsions were observed after removing from the freezer.

TABLE VIII

| Ex. No. | Non-Ionic Used | Additions to Original Emulsion | Percent Weight Composition ||||||||| 
|---|---|---|---|---|---|---|---|---|---|---|---|
| | | | Unleaded Gasoline | Non-Ionic | Ammonium Salts of Fatty Acids from Emersol 140 | Ammonium Oleate | Free Oleic Acid | Iso-propanol | Ethanol | Methanol | Water |
| 34 | NP-14 and NP-27 (5 mls. each) | 10 mls. methanol | 53.7 | 10.4 | 0.6 | 1.9 | 2.3 | 8.1 | 8.8 | 8.2 | 6.0 |
| 35 | Lipal-9-OL | 10 mls. iso-propanol 10 mls. iso-propanol | 58.5 | 11.3 | 0.7 | 2.1 | 2.5 | 8.8 | 9.6 | — | 6.5 |
| 36 | Emerest 2646 | 20 mls. ethanol | 53.6 | 10.4 | 0.6 | 1.9 | 2.3 | — | 25.2 | — | 6.0 |
| 37 | Emsorb 6901 | 2 mls. water 15 mls. iso-propanol 10 mls. ethanol | 50.6 | 9.8 | 0.6 | 1.8 | 2.2 | 11.4 | 16.0 | — | 7.6 |
| 38 | Emsorb 6900 | 2 mls. water 25 mls. ethanol 5 mls. iso-propanol | 48.7 | 9.4 | 0.5 | 1.7 | 2.1 | 3.7 | 26.6 | — | 7.3 |
| 39 | Emerest 2620 | 2 mls. water 25 mls. ethanol 5 mls. iso-propanol | 48.7 | 9.4 | 0.5 | 1.7 | 2.1 | 3.7 | 26.6 | — | 7.3 |
| 40 | Emsorb 6915 | 2 mls. water 23 mls. ethanol 5 mls. iso-propanol | 48.7 | 9.4 | 0.5 | 1.7 | 2.1 | 3.7 | 26.6 | — | 7.3 |

These W/O emulsions showed an unusually strong Tyndall effect.

V. Examples With Mixture of Emery 655 (Myristic Acid 97) and Oleic Acid With Various Non-Ionic Surfactants for W/O Emulsions With Unleaded Gasoline Preparation of Stock Solution K Five grams of Emery 655 were dissolved in a mixture of 50 mls. methanol and 50 mls. of ethanol. Five mls. of concentrated ammonium hydroxide were added followed by 50 mls. of water. A slightly cloudy solution resulted. But when 37.9 gms. of oleic acid were added the solution became clear.

The weights of components in Stock Solution K were:

| | Grams |
|---|---|
| Ammonium Salts of Fatty Acids from Emery 655 | 5.4 |

The weight percent of each component in each of these W/O emulsions was: gasoline - 64.0, non-ionic surfactant 12.4, ammonium salts of the fatty acids of Emery 655 - 7.0, ammonium oleate - 2.2, free oleic acid - 3.0, methanol - 5.3, ethanol - 5.3 and water - 7.1.

VI. Examples With Mixture of Stearic Acid and Oleic Acid Using Various Non-Ionic Surfactants for W/O Emulsions With Unleaded Gasoline A stock solution (SS L) was prepared as follows:

Five grams of stearic acid were suspended in a mixture of 50 mls. of methanol and 50 mls. of isopropanol. The fatty acid slowly dissolved but the solution was cloudy. When 50 mls. of water were added the contents thickened to a cream. When 5 mls. of concentrated ammonium hydroxide were added the creamy suspension immediately thinned to a solution having some insoluble particles that had the appearance of silvery lines. When 38.6 gms. of oleic acid were added, a clear solution was obtained.

The weight composition of stock solution L was as follows:

|  | Grams |
|---|---|
| Ammonium Stearate | 5.3 |
| Ammonium Oleate | 17.7 |
| Free Oleic Acid | 21.9 |
| Methanol | 39.5 |
| Isopropanol | 39.0 |
| Water | 53.2 |
|  | 176.6 |
| Volume of stock solution L used for each experiment, mls. | 20 |
| Weight of stock solution L used for each experiment, gms. | 18.1 |

W/O emulsions were prepared by adding 10 mls. of a non-ionic surfactant to 70 mls. of unleaded gasoline followed by 20 mls. of stock solution L. All of the emulsions were clear and stable at room temperature. However, when they were placed in a freezer at −24° C. overnight a large amount of flocculent precipitate occurred.

The emulsions were brought back to room temperature and again, were clear. To each one were added 15 mls. of isopropanol. They were again placed in the freezer overnight. Now they were clear and stable at −24° C.

The following are examples using Stock Solution L:

TABLE IX

| Ex. No. | Non-Ionic | Unleaded Gasoline | Non-Ionic | Ammonium Stearate | Ammonium Oleate | Free Oleic Acid | Methanol | Iso-propanol | Water |
|---|---|---|---|---|---|---|---|---|---|
| 41 | 10 mls. Emerest 2646 | 56.5 | 10.9 | 0.6 | 2.0 | 2.4 | 4.4 | 17.2 | 6.0 |
| 42 | 10 mls. Lipal-9-OL | 56.5 | 10.9 | 0.6 | 2.0 | 2.4 | 4.4 | 17.2 | 6.0 |
| 43 | 10 mls. Emsorb 6900 | 56.5 | 10.9 | 0.6 | 2.0 | 2.4 | 4.4 | 17.2 | 6.0 |

VII. Examples With Mixture of Lauric Acid (Emery 651) and Oleic Acid Using Various Non-Ionic Surfactants for W/O Emulsions With Unleaded Gasoline A stock solution (SS M) was prepared as follows:
Five grams of lauric acid were dissolved in a mixture of 50 mls. of methanol and 50 mls. of isopropanol. A clear solution resulted. Fifty milliliters of water were added followed by 5 mls. of concentrated ammonium hydroxide (29% $NH_3$ - s.g. 0.9). Then 40.0 gms. of oleic acid were added.

The resulting clear stock solution M had the following weight composition:

|  | Grams |
|---|---|
| Ammonium Laurate | 5.4 |
| Ammonium Oleate | 15.5 |
| Free Oleic Acid | 25.3 |
| Methanol | 39.5 |
| Isopropanol | 39.0 |
| Water | 53.2 |
|  | 177.9 |
| Volume of Stock Solution M used for each experiment, mls. | 20 |
| Weight of Stock Solution M used for each experiment, gms. | 18.0 |

W/O emulsions were prepared by mixing 10 mls. of a non-ionic surfactant with 70 mls. of unleaded gasoline followed by 20 mls. of stock solution M. The emulsions were clear and exhibited the usual Tyndall effect. They were placed in the freezer at −24° C. overnight. When examined, they were clear and stable.

Examples using Stock Solution M are:

TABLE X

| Ex. No. | Non-Ionic | Unleaded Gasoline | Non-Ionic | Ammonium Laurate | Ammonium Oleate | Free Oleic Acid | Methanol | Iso-propanol | Water |
|---|---|---|---|---|---|---|---|---|---|
| 44 | 10 mls. Emsorb | 64.9 | 12.5 | 0.7 | 2.0 | 3.2 | 5.0 | 5.0 | 6.7 |
| 45 | 10 mls. Lipal-9-OL | 64.9 | 12.5 | 0.7 | 2.0 | 3.2 | 5.0 | 5.0 | 6.7 |
| 46 | 10 mls. Emerest 2646 | 64.9 | 12.5 | 0.7 | 2.0 | 3.2 | 5.0 | 5.0 | 6.7 |

VIII. Examples With Mixture of Sodium Oleate and Ammonium Oleate Using Various Non-Ionic Surfactants for W/O Emulsions With Unleaded Gasoline A stock solution (SS N) was prepared as follows:
A weight of 45.9 grams of oleic acid was dissolved in 100 mls. of methanol. Then a solution of 1.0 gram of NaOH in 50 mls. of water was added. A volume of 3 mls. of concentrated ammonium hydroxide was added.

The clear stock solution N had the following weight composition:

|  | Grams |
|---|---|
| Sodium Oleate | 7.6 |
| Ammonium Oleate | 13.8 |
| Free Oleic Acid | 25.9 |
| Methanol | 79.0 |
| Water | 52.3 |
|  | 178.6 |
| Volume of Stock Solution N used for each experiment, mls. | 22 |
| Weight of Stock Solution N used for each experiment, gms. | 19.9 |

W/O emulsions were prepared by mixing 10 mls. of a non-ionic surfactant with 70 mls. of unleaded gasoline followed by 22 mls. of stock solution N. The emulsions were clear at room temperature. Furthermore, they were clear and stable when exposed to −24° C. overnight.

Examples using Stock Solution N are:

TABLE XI

| Ex. No. | Non-Ionic | Unleaded Gasoline | Non-Ionic | Sodium Oleate | Ammonium Oleate | Free Oleic Acid | Methanol | Water |
|---|---|---|---|---|---|---|---|---|
| 47 | 10 mls. Lipal-5 mls. NP-14 | 63.4 | 12.2 | 1.1 | 1.9 | 3.5 | 10.8 | 7.1 |
| 48 | 5 mls. NP-14 and 5 mls. NP-37 | 63.4 | 12.2 | 1.1 | 1.9 | 3.5 | 10.8 | 7.1 |

IX. Examples Where Sodium Oleate and Free Oleic Acid and Non-Ionic Surfactants are Used for W/O Emulsions With Unleaded Gasoline A weight of 45.9 grams of oleic acid dissolved in 100 mls. methanol was treated with a solution of 3.3 gms. of NaOH in 50 mls. water. The clear solution had the following composition:

|  | Grams |
|---|---|
| Sodium Oleate | 25.1 |
| Free Oleic Acid | 22.7 |
| Methanol | 79.0 |
| Water | 51.5 |
|  | 178.3 |
| (22 mls. equivalent to 19.9 grams) |  |

To 70 mls. unleaded gasoline were added 10 mls. non-ionic surfactant followed by 22 mls. of the stock solution. Clear emulsions resulted.

When the emulsions were exposed to −24° C. overnight, they remained clear. Examples are:

TABLE XII

| Ex. No. | Non-Ionic | Unleaded Gasoline | Non-Ionic | Sodium Oleate | Free Oleic Acid | Methanol | Water |
|---|---|---|---|---|---|---|---|
| 49 | 10 mls. Lipal-9-OL | 63.4 | 12.3 | 3.4 | 3.1 | 10.8 | 7.0 |
| 50 | 5 mls. NP-14 and 5 mls. NP-27 | 63.4 | 12.3 | 3.4 | 3.1 | 10.8 | 7.0 |

Another stock solution (SS O) was prepared in which all of the oleic acid was neutralized with the stoichiometric amount of sodium hydroxide. Thus, the solution was formed from 50 mls. of water, 6.5 gms. of sodium hydroxide, 40.5 gms. of oleic acid and 100 mls. of methanol.

When 70 mls. of unleaded gasoline was mixed with 10 mls. of a non-ionic surfactant like Lipal-9-OL followed by 22 mls. of stock solution O, the resulting emulsion was cloudy and quickly separated into two layers. However, when some free oleic acid was added a clear, stable W/O emulsion resulted.

This demonstrates that the presence of free oleic acid is necessary in order to obtain clear and stable W/O emulsions using sodium oleate or an alkali metal salt of an unsaturated fatty acid.

X. Examples Where all of The Oleic Acid is Neutralized With Ammonia and Used in Combination With Various Non-Ionic Surfactants for W/O Emulsions With Unleaded Gasoline A stock solution (SS P) was prepared by dissolving 45.0 gms. of oleic acid in 100 mls. of methanol, adding 50 mls. of water and then 10.4 mls. of concentrated ammonium hydroxide (29% NH₃ - s.g. 0.9). The resulting clear solution had the following weight composition

|  | Grams |
|---|---|
| Ammonium Oleate | 47.7 |
| Methanol | 79.0 |
| Water | 56.6 |
|  | 183.3 |
| Volume of Stock Solution P used for each experiment, mls. | 22 |
| Weight of Stock Solution P used for each experiment, gms. | 20.0 |

W/O emulsions were prepared by mixing 70 mls. of unleaded gasoline with 10 mls. of a non-ionic surfactant followed by 22 mls. of stock solution P. Clear and stable emulsions were formed. Furthermore, the W/O emulsions were clear and stable when exposed to −24° C. overnight.

Examples are:

TABLE XIII

| Ex. No. | Non-Ionic | Unleaded Gasoline | Non-Ionic | Ammonium Oleate | Methanol | Water |
|---|---|---|---|---|---|---|
| 51 | Lipal-9-OL | 63.3 | 12.2 | 6.4 | 10.5 | 7.6 |
| 52 | Emerest 2646 | 63.3 | 12.2 | 6.4 | 10.5 | 7.6 |

These examples demonstrate that unlike sodium hydroxide, ammonium hydroxide can be used to completely neutralize the oleic acid and still obtain clear and stable emulsions. A possible explanation is that ammonium oleate, being a salt of both a weak base and weak acid may hydrolyze to sufficient extent such that a significant amount of free oleic acid is present at equilibrium to stabilize this W/O emulsion.

EXAMPLES USING DIESEL FUEL

The unleaded gasoline "control" described in the previous examples is completely stable at −24° C. Accordingly, it remains as a single phase, clear liquid at this low temperature. Diesel fuel, on the other hand, forms a sludge at −24° C. Examination of the diesel fuel "control" on warming from −24° C. is summarized as follows:

The sludge contains numerous small crystalline-appearing particles when the control is removed from the freezer. The sludge thins rapidly and the fuel is quite fluid at −20° C., although still cloudy due to the suspension of particles. With continued warming the suspended particles slowly dissolve. However, complete clearing does not occur to about −4° C. Even then there is a slight haze to the diesel fuel which is also characteristic of diesel fuel at room temperature.

In order to evaluate W/O emulsions made with diesel fuel regarding low temperature stability the following observations were made so that a meaningful comparison to the control could be achieved:

1. Appearance on first removing from freezer at −24° C.
2. Degree of fluidity at −24° C. and also the tendency for fluidity as the samples are slowly warmed.
3. Observation of particles during warming.
4. Temperature at which complete clearing occurs.

The overall rating for each emulsion regarding low temperature stability was defined as follows:
1. "Better than control" - which means that clearing occurs at a lower temperature than the control.
2. "Same as control" i.e., clearing at −4° C.
3. "Worse than control" i.e., clearing does not occur until a temperature higher than −4° C.

XI. Examples Using Oleic Acid With Various Non-Ionic Surfactants for W/O Emulsions With Diesel Fuel Stock solutions F and G were used. The preparation and composition of each of these are described in the previous Section III.

The W/O emulsions were prepared by adding 10 mls. of a non-ionic surfactant to 70 mls. of diesel fuel followed by 25 mls. of stock solution F or 22 mls. of stock solution G. In practically all cases when clear emulsions were formed at room temperature, the clarity was actually significantly better than the control diesel fuel which has a characteristic slight haze.

Examples in which clear W/O emulsions were formed at room temperature and then subjected to −24° C. for low temperature evaluation are shown in the table below. All of the emulsions listed in the table were as good or better than the control. All were quite fluid at −24° C. although there was suspended material present. When they cleared on warming, all were considerably clearer than the control diesel fuel itself. The table shows the clearing temperature and the weight percentage composition for each of the W/O emulsions.

TABLE XIV

| Ex. No. | Stock Solution Used | Non-Ionic Used | Temp. at which Emulsion Completely Clears °C | Weight Percentage Composition | | | | | |
|---|---|---|---|---|---|---|---|---|---|
| | | | | Diesel Fuel | Non-Ionic | Free Oleic Acid | Ammonium Oleate | Methanol | Water |
| 53 | F | NP-14 and NP-27 (5 mls. each) | −5 | 64.8 | 11.0 | 4.3 | 5.2 | 9.0 | 5.7 |
| 54 | F | NP-14 | −5 | 64.8 | 11.0 | 4.3 | 5.2 | 9.0 | 5.7 |
| 55 | F | Lipal-9-OL | −5 | 64.8 | 11.0 | 4.3 | 5.2 | 9.0 | 5.7 |
| 56 | F | Emerest 2646 | −5 | 64.8 | 11.0 | 4.3 | 5.2 | 9.0 | 5.7 |
| 57 | G | NP-14 | −6 | 67.2 | 11.5 | 4.5 | 5.4 | 9.4 | 2.0 |
| 58 | G | NP-14 and NP-27 (5 mls. each) | | 67.2 | 11.5 | 4.5 | 5.4 | 9.4 | 2.0 |
| 59 | G | Lipal-9-OL | −5 | 67.2 | 11.5 | 4.5 | 5.4 | 9.4 | 2.0 |
| 60 | G | Emerest 2646 | −5 | 67.2 | 11.5 | 4.5 | 5.4 | 9.4 | 2.0 |
| 61 | G | Emerest 2620 | −4 | 67.2 | 11.5 | 4.5 | 5.4 | 9.4 | 2.0 |

Although it is preferred to use 2:1 ratio of non-ionic to the mixture of fatty acid and its ammonium salt when preparing W/O emulsions with gasoline, this is not the case with diesel fuel, or for that matter with fuel oil. For the latter, it is better to use about a 1:1 or even 1:2 ratio. The 1:2 ratio is actually preferred because considerably less total amount of surface-active agents is used with this ratio. The stability of the emulsion with this 1:2 ratio and having sufficient water is also good at −24° C. Examples are:

TABLE XV

| Ex. No. | Stock Solution Used | Non-Ionic Used | Freezer Results Clearing Temp. °C | Weight Percent Composition | | | | | |
|---|---|---|---|---|---|---|---|---|---|
| | | | | Diesel Fuel | Non-Ionic | Free Oleic Acid | Ammonium Oleate | Methanol | Water |
| 62 | F | 5 mls. of NP-14 | −6 | 68.6 | 5.9 | 4.5 | 5.5 | 9.5 | 6.0 |
| 63 | G | 5 mls. of NP-14 | +2 | 71.3 | 6.1 | 4.7 | 5.8 | 10.0 | 2.1 |
| 64 | F | 5 mls. of Lipal-9-OL | −5 | 68.6 | 5.9 | 4.5 | 5.5 | 9.5 | 6.0 |

Note that the emulsion having less water did not clear as readily as those having a higher percentage of water when less non-ionic surfactant is used. Thus, comparison of Ex. 62 to Ex. 57 of the previous table shows about the same percentage of water but Ex. 57 cleared at −6° C. The only significant difference between these is the amount of non-ionic surfactant. On the other hand, when the percentage of water is higher the amount of non-ionic is not as ciritical as shown in the comparison of Exs. 54 and 62.

XII. Examples Using Oleic Acid and 85/15 Cyclohexanol/Cyclohexanone With Various Non-Ionic Surfactants for W/O Emulsions With Diesel Fuel It was discovered that the addition of 85/15 v/v cyclohexanol/cyclohexanone gave clearer W/O emulsions with diesel fuel and also enhanced their stabilities at −24° C. Furthermore, the use of this reagent broadened the range of type of non-ionic surfactant used. Specifically, surfactants (non-ionic) not having an attached polyoxyethylene chain like Span 80 or Emsorb 2515, could be used effectively with the cyclohexanol/cyclohexanone mixture. Without the latter stable W/O emulsions could not be readily prepared using Span 80 or Emsorb 2515.

Examples are:

TABLE XVI

| Ex. No. | Stock Solution Used | Non-Ionic Used | 85/15 v/v Cyclohexanol/ cyclohexanone, mls. | Clearing Temp., ° C. | Weight Percent Composition | | | | | |
|---|---|---|---|---|---|---|---|---|---|---|
| | | | | | Diesel Fuel | Non-Ionic | Ammonium Oleate | Free Oleic Acid | 85/15 Cyclohexanol Cyclohexnone v/v | Methanol | Water |
| 65 | F | 5 mls NP-14 | 5 | −8 | 65.0 | 5.6 | 5.2 | 4.3 | 5.2 | 9.0 | 5.7 |
| 66 | G | 5 mls NP-14 | 5 | −7 | 67.4 | 5.8 | 5.5 | 4.5 | 5.4 | 9.4 | 2.0 |
| 67 | F | 5 mls Emsorb 6901 | 5 | −7 | 65.0 | 5.6 | 5.2 | 4.3 | 5.2 | 9.0 | 5.7 |
| 68 | 1. | 5 mls Span 80 | 5 | −7 | 65.0 | 5.6 | 5.2 | 4.3 | 5.2 | 9.0 | 5.7 |
| 69 | 1. | 5 mls Embsorb 2515 | 5 | −10 | 65.0 | 5.6 | 5.2 | 4.3 | 5.2 | 9.0 | 5.7 |

If the cyclohexanol/cyclohexanone is omitted in Exs. 68 and 69, the emulsions are not even stable at room temperature.

Compare 66 with 63 of previous table. The W/O emulsion of Ex. 66 has much better low temperature stability.

If the polyoxyethylene chain in the non-ionic is too long, the cyclohexanol/cyclohexanone is not effective. Examples are:

TABLE XVII

| Ex. No. | Stock Solution Used | Non-Ionic | 85/15 v/v Cyclohexanol/ Cyclohexanone | Appearance of Emulsion at Room Temperature |
|---|---|---|---|---|
| 70 | F | 5 mls. Lipal-9-OL | 5 mls. | Cloudy, Separates into two layers. |
| 71 | F | 5 mls. Np-27 | 5 mls. | Cloudy, Separates into two layers. |

Compare Ex. 70 with Ex. 64 in the previous table. The W/O emulsion of Ex. 64 has excellent stability both at room temperature and −24° C. The only difference between 64 and 70 is that 5 mls. of cyclohexanol/cyclohexanone were added to the latter.

The conclusion indicated by the examples is that cyclohexanol/cyclohexanone enhances or stabilizes W/O emulsions where the non-ionic either has no polyoxyethylene chain attached or a short polyoxyethylene attached. When the polyoxyethylene chain is too long, the emulsions are not stable.

Water can be added to W/O emulsions without significantly affecting the stability. This is true whether or not cyclohexanol/cyclohexanone is present. In the following examples, 5 mls. of water were added to each of the W/O emulsions at room temperature. They were completely clear at room temperature and showed excellent stability at low temperature compared to the control.

TABLE XVIII

| Ex. No. | Stock Solution Used | Non-Ionic | 85/15 v/v Cyclohexanol/Cyclohexanone Added | Clearing Temp., ° C. | Percent Weight Composition | | | | | |
|---|---|---|---|---|---|---|---|---|---|---|
| | | | | | Diesel Fuel | Non-Ionic | Free Oleic Acid | Ammonium Oleate | Cyclohexanol Cyclohexanone | Methanol | Water |
| 72 | 2 | 5 mls NP-14 | 5 mls | −6 | 61.6 | 5.2 | 4.0 | 5.0 | 5.0 | 8.5 | 10.7 |
| 73 | 2 | 5 mls Lipal-9-OL | None | −4 | 64.8 | 5.5 | 4.3 | 5.2 | — | 9.0 | 11.2 |

XIII. Examples Using Linoleic Acid (Emersol 305) With and Without Cyclohexanol/Cyclohexanone for W/O Emulsions With Diesel Fuel Stock solution E described in section II was used. Five mls. of NP-14 were added to 70 mls. diesel fuel followed by 25 mls. stock solution E. A clear W/O emulsion resulted. When subjected to −24° C. it was similar to the control; very fluid at −24° C. but cloudy and clearing occurring at −4° C. When clearing did occur, the emulsion was actually clearer than the control.

The addition of 5 mls. of 85/15 v/v cyclohexanol/cyclehexanone made the W/O emulsion even better. Clearing occurred at −5° C. and clarity was still sharper.

It should be noted that stock solution B could be used but required twice as much non-ionic surfactant. Moreover, the resulting W/O emulsion did not show as good low temperature stability as the control. Clearing did not occur until +1° C.

The weight percent compositions of the emulsions in which stock solution E was used are:

(a) Without Cyclohexanol/Cyclohexanone
Diesel fuel - 68.1, NP-14 - 5.8, free fatty acids - 4.5, ammonium salts of fatty acids - 5.5, methanol - 9.4 and water - 6.7.

(b) With Cyclohexanol/Cyclohexanone
Diesel fuel - 64.5, NP-14 - 5.5, free fatty acids - 4.3, ammonium salts of fatty acids - 5.2, methanol - 8.9, cyclohexanol/cyclohexanone - 5.2 and water - 6.4.

XIV. Examples Using a Mixture of Oleic Acid and Soya Fatty Acid (Emery 610) With Various Non-Ionic Surfactants for W/O Emulsions With Diesel Fuel A stock solution (SS Q) was prepared as follows:
Twenty gms. of Emery 610 were mixed with 100 mls. of methanol, 50 mls. of water and 10 mls. of concentrated ammonium hydroxide (29% $NH_3$ - s.g. 0.9). After reaction, 61 gms. of oleic acid were added. The clear solution had the following weight composition:

| | Grams |
|---|---|
| Ammonium Salts of Fatty Acids from Emery 610 | 21.2 |
| Ammonium Oleate | 24.5 |
| Free Oleic Acid | 37.8 |
| Methanol | 79.0 |
| Water | 56.4 |
| | 218.9 |
| Volume of Solution used for each Exp., mls. | 24 |
| Weight of Solution used for each Exp., gms. | 21.2 |

W/O emulsions were prepared by adding 5 mls. of a non-ionic surfactant to 70 mls. of diesel fuel followed by 24 mls. of stock solution Q. All of the emulsions described below were clear at room temperature. Also, 5 mls. of 85/15 v/v cyclohexanol/cyclohexanone were added to some of the emulsions to determine if this addition will enhance low temperature stability.

All of the emulsions were exposed to −24° C. overnight. Examples with results are shown in the following table:

TABLE XIX

| Ex. No. | Non-Ionic | 85/15 v/v Cyclo-hexanol/Cyclo-hexanone, mls | Freezer Results: Clearing Temp., ° C. | Weight Percent Composition | | | | | | |
|---|---|---|---|---|---|---|---|---|---|---|
| | | | | Diesel Fuel | Non-Ionic | Ammon-ium Salts of Fatty Acids from Emery 610 | Ammon-ium Oleate | Free Oleic Acid | Meth-anol | Cyclo-hexanol/Cyclo-hexanone | Water |
| 74 | NP-14 | — | — | 69.1 | 5.9 | 2.4 | 2.8 | 4.3 | 9.0 | — | 6.5 |
| 75 | NP-14 | 5 | −6 | 65.4 | 5.6 | 2.3 | 2.6 | 4.1 | 8.6 | 5.3 | 6.1 |
| 76 | Lipal-9-OL | — | −5 | 69.1 | 5.9 | 2.4 | 2.8 | 4.3 | 9.0 | — | 6.5 |
| 77 | Emsorb 2515 | — | −4 | 69.1 | 5.9 | 2.4 | 2.8 | 4.3 | 9.0 | — | 6.5 |
| 78 | Emsorb 6901 | — | −4 | 69.1 | 5.9 | 2.4 | 2.8 | 4.3 | 9.0 | — | 6.5 |
| 79 | Emsorb 6901 | 5 | −6 | 65.4 | 5.6 | 2.3 | 2.6 | 4.1 | 8.6 | 5.3 | 6.1 |

XV. Examples Using a Mixture of Oleic Acid and Distilled Tall Oil (Emtall 729) With Various Non-Ionic Surfactants for W/O Emulsions With Diesel Fuel A stock solution (SS R) was prepared as follows:

Twenty gms. of Emtall 729 were mixed with 100 mls. of methanol, 50 mls. of water and 10 mls. of concentrated ammonium hydroxide (29% NH₃ - s.g. 0.9). After reaction, 61 gms. of oleic acid were added. The resulting clear solution had the following weight composition:

| | Grams |
|---|---|
| Ammonium Salts of Fatty Acids from Emtall 729 | 21.1 |
| Ammonium Oleate | 25.9 |
| Free Oleic Acid | 36.6 |
| Methanol | 79.0 |
| Water | 56.4 |
| | 219.0 |
| Volume of Solution used for each Exp., mls. | 24 |
| Weight of Solution used for each Exp., gms. | 21.4 |

W/O emulsions were prepared by adding 5 mls. of a non-ionic surfactant to 70 mls. of diesel fuel followed by 24 mls. of stock solution R. All of the emulsions were clear at room temperature. They were exposed to −24° C. overnight. Examples with results are shown in the following table:

TABLE XX

| Ex. No. | Non-Ionic | Freezer Results: Clearing Temp., ° C. | Weight Percent Composition | | | | | |
|---|---|---|---|---|---|---|---|---|
| | | | Diesel Fuel | Non-Ionic | Ammon-ium Salts of Fatty Acids of Emtall 729 | Ammon-ium Oleate | Free Oleic Acid | Meth-anol | Water |
| 80 | NP-14 | −5 | 68.9 | 5.9 | 2.4 | 3.0 | 4.2 | 9.1 | 6.5 |
| 81 | Lipal-9-OL | −4 | 68.9 | 5.9 | 2.4 | 3.0 | 4.2 | 9.1 | 6.5 |
| 82 | Emerest 2620 | −4 | 68.9 | 5.9 | 2.4 | 3.0 | 4.2 | 9.1 | 6.5 |
| 83 | Emerest 2646 | −6 | 68.9 | 5.9 | 2.4 | 3.0 | 4.2 | 9.1 | 6.5 |
| 84 | Emsorb 6910 | −4 | 68.9 | 5.9 | 2.4 | 3.0 | 4.2 | 9,1 | 6.5 |

XVI. Examples Using a Mixture of Sodium Oleate and Ammonium Oleate in Combination With Various Non-Ionic Surfactants for W/O Emulsions With Diesel Fuel A stock solution (SS S) was prepared as follows:

A weight of 90.0 gms. of oleic acid was dissolved in 100 mls. of methanol followed by adding a solution of 2.0 gms. of sodium hydroxide in 50 mls. of water. Then 8 mls. of concentrated ammonium hydroxide were added (0.29% NH₃ - s.g. 0.9). The clear solution had the following weight composition:

| | Grams |
|---|---|
| Sodium Oleate | 15.2 |
| Ammonium Oleate | 36.7 |
| Free Oleic Acid | 41.3 |
| Methanol | 79.0 |
| Water | 56.0 |
| | 228.2 |
| Volume of Stock Solution S used for each Exp., mls. | 25 |
| Weight of Stock Solution S used for each Exp., gms. | 22.4 |

W/O emulsions were prepared by adding 7 mls. of a non-ionic surfactant to 70 mls. of diesel fuel followed by 25 mls. of stock solution S. Clear W/O emulsions were obtained. They were then subjected to −24° C. overnight. Results were:

TABLE XXI

| Ex. No. | Non-Ionic | Freezer Results Clearing Temp. °C. | Percent Weight Composition | | | | | | |
|---|---|---|---|---|---|---|---|---|---|
| | | | Diesel Fuel | Non-Ionic | Sodium Oleate | Ammonium Oleate | Free Oleic Acid | Methanol | Water |
| 85 | Lipal-9- | −4 | 66.5 | 8.0 | 1.7 | 4.1 | 4.6 | 8.8 | 6.3 |
| 86 | Emerest 2646 | −4 | 66.5 | 8.0 | 1.7 | 4.1 | 4.6 | 8.8 | 6.3 |
| 87 | Emsorb 6900 | −4 | 66.5 | 8.0 | 1.7 | 4.1 | 4.6 | 8.8 | 6.3 |

XVII. Examples Using Oleic Acid Partially Neutralized With Sodium Hydroxide in Combination With Various Non-Ionic Surfactants for W/O Emulsions with Diesel Fuel A stock solution (SS T) was prepared by dissolving 90.0 gms. of oleic acid in 100 mls. of methanol followed by adding a solution of 6.4 gms. of sodium hydroxide in 60 mls. of water. The weight composition of the clear solution was as follows:

| | Grams |
|---|---|
| Sodium Oleate | 48.6 |
| Free Oleic Acid | 44.9 |
| Methanol | 79.0 |
| Water | 62.9 |
| | 235.4 |
| (25 mls. equivalent to 22.4 gms.) | |

It was found that 5 mls. of non-ionic surfactant was insufficient to prepare the W/O emulsion. It took between 6 and 10 mls. to make the emulsion stable at room temperature. The procedure was to add the non-ionic to 70 mls. of diesel fuel followed by 25 mls. of stock solution T.

All emulsions were clear at room temperature. However, on subjecting to −24° C. overnight an extremely large amount of precipitate occurred. When warming, clearing did not occur until +2° C.

Five mls. of water were added to each emulsion. They were clear at room temperature. When subjected to −24° C., there resulted the same large amount of precipitate in each sample. Again, clearing for each sample did not occur until −2° C.

While certain representative embodiments and details have been shown for the purpose of illustrating the invention, it will be apparent to those skilled in the art that various changes and modifications may be made therein without departing from the scope of the invention as defined by the appended claims.

In the foregoing examples, in sections XI–XVII, the hydrocarbon fuel used is described as diesel fuel. Since diesel fuel is so similar in its chemical and physical properties to fuel oil, and indeed, since diesel fuel may be used as fuel oil, these examples in sections XI–XVII further serve to exemplify the invention as applied to fuel oil.

We claim:

1. A clear, liquid fuel composition which comprises:
   (a) a hydrocarbon fuel;
   (b) about 0.1% to about 10% by weight water; and
   (c) a surface-active amount of a combination of surface-active agents consisting of:
       (i) a saturated or unsaturated long-chain fatty acid salt having from 12–18 carbon atoms or a mixture thereof;
       (ii) a free unsaturated long-chain fatty acid having from 12–18 carbon atoms, or a mixture of free unsaturated and saturated long chain fatty-acids having from 12–18 carbon atoms; and
       (iii) a non-ionic surfactant.

2. A fuel composition, according to claim 1, wherein the hydrocarbon fuel is gasoline.

3. A fuel composition, according to claim 1, wherein the hydrocarbon fuel is fuel oil.

4. A fuel composition, according to claim 1, wherein the hydrocarbon fuel is diesel fuel.

5. A fuel composition, according to claim 1, containing about 0.5% to 5% water.

6. A fuel composition, according to claim 1, stable below the freezing point of water which further includes a water-soluble alcohol selected from the group consisting of methanol, ethanol, isopropanol, or mixtures thereof, said alcohol comprising about 1% to 10% by weight of the composition.

7. A fuel composition, according to claim 1, wherein a saturated long-chain fatty acid is used in combination with the unsaturated acid.

8. A fuel composition, according to claim 1, wherein the long-chain fatty acid salt is an ammonium salt or a sodium salt, or a mixture thereof.

9. A fuel composition, according to claim 8, wherein the long-chain fatty acid salt is a mixture of ammonium and sodium oleate.

10. A fuel composition, according to claim 8, wherein the molar ratio of the ammonium to the sodium long-chain fatty acid salt ranges from 95:5 to 5:95.

11. A fuel composition, according to claim 1, containing an added source of sodium ions for strong acid neutralization.

12. A fuel composition, according to claim 1, wherein the free acid comprises free oleic acid.

13. A fuel composition, according to claim 1, wherein the non-ionic surfactant is an ethylene oxide condensation or esterification product.

14. A composition according to claim 13, wherein the ethylene oxide condensation or esterification product is formed with (i) an alkyl phenol of the formula:

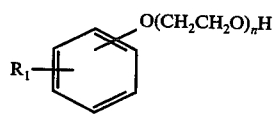

wherein $R_1$ is alkyl having up to 8 carbon atoms and $n$ is an integer from 5 to 20;
   (ii) a fatty acid of the formula:

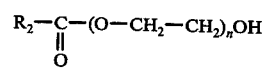

(iii) a fatty alcohol of the formula:

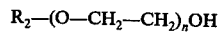

wherein $R_2$ is a long-chain, saturated or unsaturated hydrocarbon radical containing 12 to 18 carbon atoms, and $n$ is an integer from 5 to 30;

(iv) a polyol having the formula:

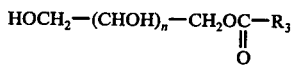

wherein $R_3$ is a long-chain, saturated or unsaturated hydrocarbon radical containing 12 to 18 carbon atoms, and $n$ is an integer from 1 to 4; or (v) a polyol and long-chain fatty acid having the formula:

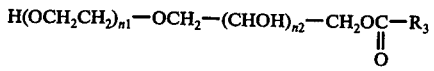

wherein $R_3$ has the meaning given above, $n_1$ is an integer from 5 to 30 and $n_2$ is an integer from 1 to 4.

15. A fuel composition, according to claim 1, wherein the ratio of the non-ionic surfactant to the saturated or unsaturated long-chain fatty acid salt ranges from 1:2 to 1:3 by weight.

16. A fuel composition, according to claim 1, containing a solution of cyclohexanol/cyclohexanone in a concentration up to about 15% by weight.

* * * * *

UNITED STATES PATENT OFFICE
CERTIFICATE OF CORRECTION

Patent No. 4,083,698          Dated April 11, 1978

Inventor(s) Edward C. Wenzel and Henry W. Steinmann

It is certified that error appears in the above-identified patent and that said Letters Patent are hereby corrected as shown below:

Col. 1, line 62, "hyrocarbon" should read --hydrocarbon--;
Col. 5, line 17, after "and" insert --a--;
Col. 8, lines 13 and 14 of TABLE I, "PEG (200) Monolaurate where" should be transferred from the column headed "Manufacturer" to the column headed "Chemical Description";
Col. 9, lines 30 and 31 of TABLE I, "acid, 1% palmitoleic acid" should be transferred from the column headed "Manufacturer" to the column headed "Chemical Description";
Col. 10, line 31, "them" should read --then--;
Col. 10, line 51, "ethanol" should read --methanol--;
Col. 10, line 52, "These" should read --There--;
Col. 14, line 21, "As" should read --An--;
Col. 15, following TABLE VI, insert the following paragraph:
   --Certain emulsions were not stable at -24°C even after adding 10 mls. of methanol. However, the addition of 5 mls. of isopropanol gave complete stability at -24°C. Examples are: --;
Col. 18, line 54, "7.0" should read --0.7--;
Col. 20, TABLE X, first line following headings, "10 mls. Emsorb" should read --10 mls. Emsorb 6900--;
Col. 21, TABLE XI, first line following headings, "10 mls. Lipal" should read --10 mls. Lipal-9-OL--;
Col. 21, TABLE XI, last line, "NP-37" should read --NP-27--;

UNITED STATES PATENT OFFICE
CERTIFICATE OF CORRECTION

Patent No. 4,083,698      Dated April 11, 1978

Inventor(s) Edward C. Wenzel and Henry W. Steinmann

It is certified that error appears in the above-identified patent and that said Letters Patent are hereby corrected as shown below:

Col. 24, TABLE XIV, Exs. Nos. 58 and 59

```
"58   G   NP-14 and                                                          "
         NP-27 (5 mls.
         each)
 59   G  Lipal-9-OL   -5   67.2   11.5   4.5   5.4   9.4   2.0
``` should read

```
--58  G   NP-14 and    -5   67.2   11.5   4.5   5.4   9.4   2.0--;
         NP-27 (5 mls.
         each)
 59   G  Lipal-9-OL   -4   67.2   11.5   4.5   5.4   9.4   2.0
```

Col. 27, TABLE XIX, first item under heading "Freezer Results: Clearing Temp., °C", "- " should read -- -5 --;

Col. 28, TABLE XX, last line, penultimate column, "9,1" should read --9.1--;
Col. 29, TABLE XXI, first line following headings, "Lipal-9-" should read --Lipal-9-OL--; and
Col. 29, line 44, "-2°C" should read -- +2°C --.

Signed and Sealed this

Third Day of October 1978

[SEAL]

Attest:

RUTH C. MASON
*Attesting Officer*

DONALD W. BANNER
*Commissioner of Patents and Trademarks*